(12) United States Patent
Bravo Orellana

(10) Patent No.: US 12,200,405 B2
(45) Date of Patent: Jan. 14, 2025

(54) SURVEILLANCE SENSOR SYSTEM

(71) Applicant: OUTSIGHT, Paris (FR)

(72) Inventor: Raul Bravo Orellana, Paris (FR)

(73) Assignee: OUTSIGHT, Paris (FR)

( * ) Notice: Subject to any disclaimer, the term of this patent is extended or adjusted under 35 U.S.C. 154(b) by 273 days.

(21) Appl. No.: 17/790,633

(22) PCT Filed: Jan. 28, 2021

(86) PCT No.: PCT/EP2021/052043
§ 371 (c)(1),
(2) Date: Jul. 1, 2022

(87) PCT Pub. No.: WO2021/152053
PCT Pub. Date: Aug. 5, 2021

(65) Prior Publication Data
US 2023/0045319 A1    Feb. 9, 2023

Related U.S. Application Data

(60) Provisional application No. 62/968,080, filed on Jan. 30, 2020.

(51) Int. Cl.
*H04N 7/18* (2006.01)
*G01S 17/86* (2020.01)
(Continued)

(52) U.S. Cl.
CPC ............. *H04N 7/181* (2013.01); *G01S 17/86* (2020.01); *G01S 17/89* (2013.01); *G06V 10/764* (2022.01);
(Continued)

(58) Field of Classification Search
CPC ........ H04N 7/181; H04N 23/90; H04N 23/95; H04N 13/254; H04N 13/25; H04N 13/271;
(Continued)

(56) References Cited

U.S. PATENT DOCUMENTS 10,108,867 B1    10/2018  Vallespi-Gonzalez et al.
2008/0169929 A1   7/2008  Albertson et al.
(Continued)

FOREIGN PATENT DOCUMENTS

EP    3 261 071       12/2017
WO    03/067360       8/2003
(Continued)

OTHER PUBLICATIONS

International Search Report dated Apr. 7, 2021, for PCT/EP2021/052043, 4 pp.
(Continued)

*Primary Examiner* — James M Hannett
(74) *Attorney, Agent, or Firm* — NIXON & VANDERHYE

(57) ABSTRACT

A surveillance sensor system for a surveillance network configured to monitor an environment surrounding a device, and including a processing unit, a tridimensional sensor and a camera. The surveillance sensor system is providing to the surveillance network, a global tridimensional map, a plurality of features including associations of the features to the corresponding tridimensional data points in the global tridimensional map, and including properties determined for each feature. The surveillance sensor system is not providing the images from the camera to the surveillance network.

17 Claims, 2 Drawing Sheets

(51) Int. Cl.
*G01S 17/89* (2020.01)
*G06V 10/764* (2022.01)
*G06V 20/52* (2022.01)
*H04N 23/90* (2023.01)
*H04N 23/95* (2023.01)

(52) U.S. Cl.
CPC .............. *G06V 20/52* (2022.01); *H04N 23/90* (2023.01); *H04N 23/95* (2023.01)

(58) Field of Classification Search
CPC ....... G01S 17/86; G01S 17/89; G06V 10/764; G06V 20/52; G06V 20/64
See application file for complete search history.

(56) References Cited

U.S. PATENT DOCUMENTS

| | | | |
|---|---|---|---|
| 2012/0106791 A1* | 5/2012 | Lim | G06T 7/55 382/103 |
| 2018/0005044 A1* | 1/2018 | Olson | G06V 20/62 |
| 2018/0089972 A1* | 3/2018 | Gabel | H04N 23/11 |
| 2018/0232947 A1 | 8/2018 | Nehmadi et al. | |
| 2019/0353791 A1* | 11/2019 | Vignard | G01S 13/931 |
| 2019/0355173 A1* | 11/2019 | Gao | G06T 19/20 |
| 2020/0301013 A1* | 9/2020 | Banerjee | G01S 17/931 |
| 2021/0056337 A1* | 2/2021 | Ono | G06V 10/764 |
| 2021/0117659 A1* | 4/2021 | Foroozan | G06V 10/25 |
| 2022/0390588 A1* | 12/2022 | Bravo Orellana | G01S 13/931 |

FOREIGN PATENT DOCUMENTS

| | | |
|---|---|---|
| WO | 2014/076920 | 5/2014 |
| WO | 2019/037129 | 2/2019 |

OTHER PUBLICATIONS

Written Opinion of the International Searching Authority dated Apr. 7, 2021, for PCT/EP2021/052043, 7 pp.

* cited by examiner

SURVEILLANCE SENSOR SYSTEM

This application is the U.S. national phase of International Application No. PCT/EP2021/052043 filed Jan. 28, 2021, which designated the U.S. and claims priority to U.S. 62/968,080 filed Jan. 30, 2020, the entire contents of each of which are hereby incorporated by reference.

FIELD OF THE INVENTION

The present invention concerns a surveillance sensor system for a surveillance network.

BACKGROUND OF THE INVENTION

A surveillance network can be for monitoring an indoor or outdoor environment (space). Such surveillance network or system can be installed on a vehicle, such a drone or an helicopter or a robot, such vehicle being have to move to survey a large environment.

The surveillance network or system often uses one and preferably several cameras for providing images to a central control unit via a network link. The central control unit can visualize a stream of images from each camera (camera video flux) and can store the stream of images for future visualization. The central control unit can also analyse the images to track a person or any object in the images. The central control unit than can detect suspicious behaviour from a person in the environment. The central control unit can apply many processes such as counting the number of persons inside a determined area of the environment (space) or determining the trajectory of any person or identifying specified action from a person in the determined area.

The images visualized or stored in the surveillance network and from the cameras can be used also to identify each person: these images may be used to recognize a specific person and to determine his identity (name, first name, . . . ) and to link this information to other information from any database.

It is sometimes forbidden to be able to derive identity of a person from a surveillance system. The camera are so accurate in terms of image resolution (number of pixels in an image) that it is impossible to guaranty at the same time a good analysis of persons behaviour and to guaranty privacy protection with these images from surveillance camera.

OBJECTS AND SUMMARY OF THE INVENTION

One object of the present invention is to provide a surveillance sensor system that avoids the above drawbacks.

To this effect, proposed surveillance sensor system for a surveillance network is configured to monitor the environment surrounding a device, and it comprises:
  a processing unit,
  a tridimensional sensor and a camera mounted on the device and each one adapted to communicate with the processing unit,
wherein the processing unit is:
  receiving a first stream comprising a plurality of N point cloud frames from a tridimensional sensor, each point cloud frame comprising a set of tridimensional data points acquired by said tridimensional sensor, said tridimensional data points being representative of features located in the environment,
  receiving a second stream comprising a plurality of M images from the camera, each image being a matrix of pixels having color values corresponding to sensed light from features located in the environment,
  detecting a plurality of features in the plurality of M images by processing said images, associating to each feature of the plurality of features, the tridimensional data points in the global tridimensional map belonging to said feature,
  determining properties of each feature of the plurality of features on the basis of the M images and the tridimensional data points associated to said feature, and
  providing to the surveillance network, the global tridimensional map, the plurality of features including the association of said features to the corresponding tridimensional data points in the global tridimensional map, and including the properties determined for each feature, and the processing unit is not providing the images from the camera to the surveillance network.

Thanks to these features, the surveillance sensor system is not providing the images from the camera to the surveillance network. The images are analysed locally and erased without being provided to the surveillance network.

Instead of an image, the surveillance sensor system provides a tridimensional map including tridimensional data points, and additional information, the features and properties of features that are related (associated/linked) to the tridimensional data points of the map. The tridimensional map is therefore enriched. However, the tridimensional map has a number of tridimensional data points that is not enough to recognize the identity of a person in the environment, because it is much less dense than a camera image.

The surveillance network using the above surveillance sensor system is then compliant privacy protection rules.

Moreover, the tridimensional maps are providing more information through the tridimensional data points, such as distances, displacements, speeds compared to only images from surveillance system cameras.

The added information is relevant for the surveillance network to track any feature (person, object) in the environment. The surveillance network can analyse the displacements of the features and can eventually detect suspicious behaviours from persons. The detection and tracking of the surveillance network is then more efficient than prior art surveillance network system storing huge amount of images from the environment that are dangerous for privacy of person and not efficient for behaviour detection.

In various embodiments of the surveillance sensor system, one and/or other of the following features may optionally be incorporated:

According to an aspect, detecting the plurality of features in the plurality of M images is processed by an image recognition process of portions in each image or in a plurality of images.
  According to an aspect, detecting the plurality of features in the plurality of M images is using a classification process of portions in each image or in a plurality of images.
  According to an aspect, associating of a feature to tridimensional data points is processed by projecting each tridimensional data point into a projected pixel in the images, and by determining if a projected pixel in an image can correspond to a feature detected, on the bases of a proximity criterion that minimizes a distance between the projected pixel and the feature detected in the image.
  According to an aspect, associating of a feature is using a plurality of images in the plurality of M images, and a plurality of projected pixels in each image of the plurality of M images, and a proximity criterion that minimizes all the distances between the projected pixels and the feature detected in the images.

According to an aspect, the properties include a color value of at least a portion of each feature.

According to an aspect, the processing unit, the tridimensional sensor and camera are integrated into one single device.

According to an aspect, the processing unit is integrated into the tridimensional sensor or the camera.

According to an aspect, the processing unit is connected to the tridimensional sensor and/or to the camera by a private network link, said private network link being different than a network link of the surveillance network.

According to an aspect, the tridimensional sensor is a light detection ranging (LiDAR) sensor.

BRIEF DESCRIPTION OF THE DRAWINGS

Other features and advantages of the invention will be apparent from the following detailed description of two of its embodiments given by way of non-limiting example, with reference to the accompanying drawings. In the drawings.

MORE DETAILED DESCRIPTION

Figure 1:
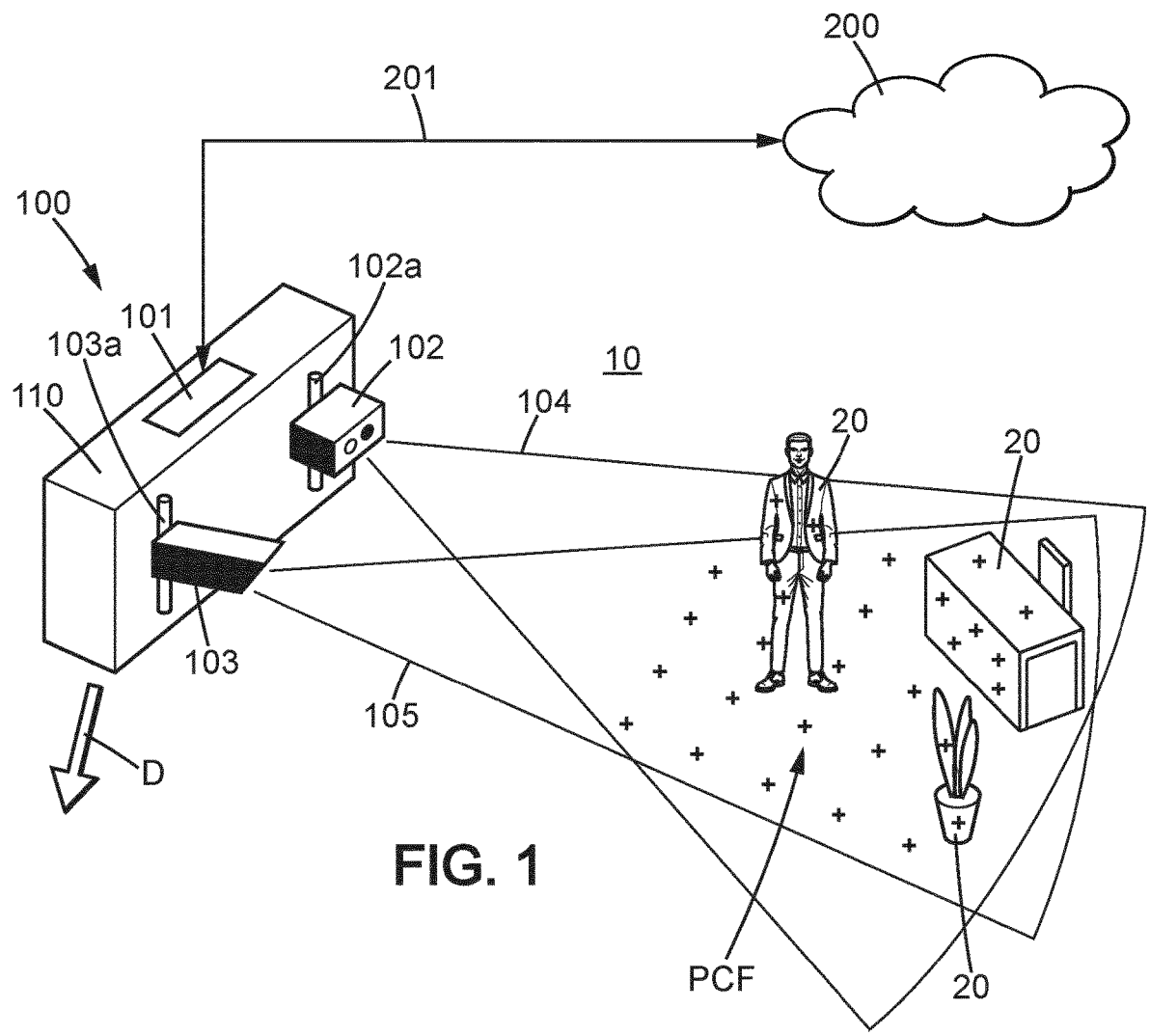
FIG. 1 is a schematic view illustrating the surveillance sensor system monitoring an environment and according to the present disclosure.

FIG. 1 illustrates a surveillance sensor system 100 for a surveillance network 200, comprising:
  a processing unit 101,
  a tridimensional sensor 102 mounted on a device 110, for example via a first mount 102a,
  a camera 103 mounted on the device 110, for example via a second mount 103a.

The device 110 is for example a vehicle or a robot. The vehicle may be a car, a drone or a helicopter. The device 110 can eventually move in the environment (space) to survey a large area of said environment.

The surveillance sensor system 100 is connected to a surveillance network 200 by a network link 201. The network link 201 may be a wired link (by copper cables or glass fiber cables) or a wireless link such as a WiFi link, or else.

The surveillance network 200 further includes a central control unit to monitor an area of the environment 10.

The tridimensional sensor 102 is for example a range sensor measuring, in a plurality of directions from the tridimensional sensor, distances between said tridimensional sensor 102 and any reflective feature 20 inside the environment 10. The feature 20 may include objects, buildings, plants, animals, human persons, etc . . . . The feature 20 is an element inside the environment 10: i.e. a static or moving element in the environment 20. In other words, the environment 10 includes a plurality of distinct features 20 (elements), that the surveillance sensor system 100 intends to detect as separate items.

The aim of the surveillance network/system may be to detect persons moving inside the environment 10, and for example to count the number of these persons inside a predetermined area of the environment. The surveillance system can track the displacement of any feature 20 inside the environment 10. Then, it may deduce suspicious behaviour of a person in a predetermined area of the environment.

The tridimensional sensor 102 is for example a light detection and ranging (LiDAR) which scans the environment using a rotating laser beam. In a variant, the tridimensional sensor 102 is a radar or sonar.

Such tridimensional sensor 102 generates:
  a point cloud frame PCF, or
  a first stream comprising a plurality of point cloud frames PCF.

The tridimensional sensor 102 is connected to the processing unit 101 to communicate to it said point cloud frame(s) PCF.

Each point cloud frame comprises a set of tridimensional data points. A tridimensional data point is a set of three (3) coordinates representing a location of a points sensed on the feature 20 in the environment. These coordinates may be given in any type coordinate system (Cartesian, polar), and for example in a coordinate system that is local to the tridimensional sensor 102; i.e. a local coordinate system that is referenced to the location of the tridimensional sensor 102.

We will consider that the first stream includes a plurality of N point cloud frames PCF, N being the number of point cloud frames in the plurality. The number N of point cloud frames PCF can be greater than one; i.e. there are two or more point cloud frames. For example, N is greater than ten (10), and N may be greater than twenty (20). The first stream includes therefore lots of tridimensional data from environment at various time instants.

We will assume that each one of this point cloud frames PCF is taken at a point cloud frame time instant $t_{PCF}$. Optionally, the tridimensional data points in a point cloud frame are scanned successively during a short time range around after and/or before the point cloud frame time instant $t_{PCF}$. In present disclosure, we will assume for simplicity that all points in a point cloud frame PCF are simultaneously scanned at said point cloud frame time instant $t_{PCF}$.

The plurality of point cloud frames PCF in the first stream is scanned at a plurality of N successive point cloud frame time instants.

As illustrated on FIG. 1, the tridimensional sensor 102 has a first field of view 104. This first field of view 104 may have a substantially conic shape from the location of tridimensional sensor 102 towards the feature 20 inside the environment 10. The first field of view 104 corresponds to a first viewpoint of location of the tridimensional sensor 102, said first viewpoint being able to view substantially the environment, i.e. the features 20 in the environment 10.

The camera 103 is an optical image capture sensor that generates:
  an image, or
  a second stream comprising a plurality of images.

The Camera 103 is connected to the processing unit 101 to communicate to it the image(s).

The image or each image of the second stream is for example a matrix of pixels having color values corresponding to the sensed light reflected from features 20 in the environment 10.

By "color values of a pixel", it is understood in present description that a pixel is assigned to data that can represent an intensity as a grey scale, or a real color for example coded as red, green, blue components values or coded with any other coded components.

As illustrated on FIG. 1, the camera 103 has a second field of view 105. The second field of view 105 may have a substantially conic shape from the location of camera 103 towards the feature 20 inside the environment 10. The second field of view 105 corresponds to a second viewpoint of location of the camera, said second viewpoint being able to view substantially the environment, i.e. the features 20 in the environment 10.

According to a first variant, the tridimensional sensor 102 and the camera 103 are located for example at different locations on the device 110 and they are oriented substantially to view the same feature 10: the first field of view 104 and the second field of view 105 intersect in the environment substantially at the location of the feature 20. Then, at least some points in the point cloud frame PCF can be assigned or associated to pixels in the image from camera 103 (if they can be seen from the camera). Then, the tridimensional point can be colored by the color value of pixel in the image corresponding to the tridimensional point.

According to a second variant, the tridimensional sensor 102 and the camera 103 are close to each other or collocated. Eventually the tridimensional sensor 102 and the camera 103 are in the same device. As above, they can view the same feature 10, and the first field of view 104 and the second field of view 105 intersect in the environment to both sense the feature 20 as explained above.

The second stream includes a plurality of M images, M being the number of images in the plurality. The number M of images is greater than one; i.e. there are two or more images. For example, M is greater than ten (10), and M may be greater than twenty (20). The second stream includes therefore lots of pixels and color data from environment at various time instants.

The plurality of images in the second stream may be taken at a plurality of M successive image time instants $t_I$.

The N point cloud frame instants $t_{PCF}$ are in general different than the M image time instants $t_I$. All these instants are included into a common time period DT in which all data from tridimensional sensor 102 (point cloud frames) and from the camera 103 (images) will be analysed together. The common time period DT is for example a time window that is shifted in time, so that the analysis takes into account the data from sensors (102, 103) in past only inside this shifted time period. In that way, the analysis is updated with most recent data.

According to a variant, the processing unit 101 may synchronise the tridimensional sensor 102 and the camera 103 to have at least some data from both devices at common time instants.

During the processing, the device 110 may be stationary into the environment 10, or may be moving into the environment 10, as illustrated in FIG. 1 by the arrow D corresponding to a displacement of the device 110. Both sensors, the tridimensional sensor 102 and the camera 103, then may scan the feature 20 from various point of views and/or can scan various tridimensional points on the feature 20.

Figure 2:
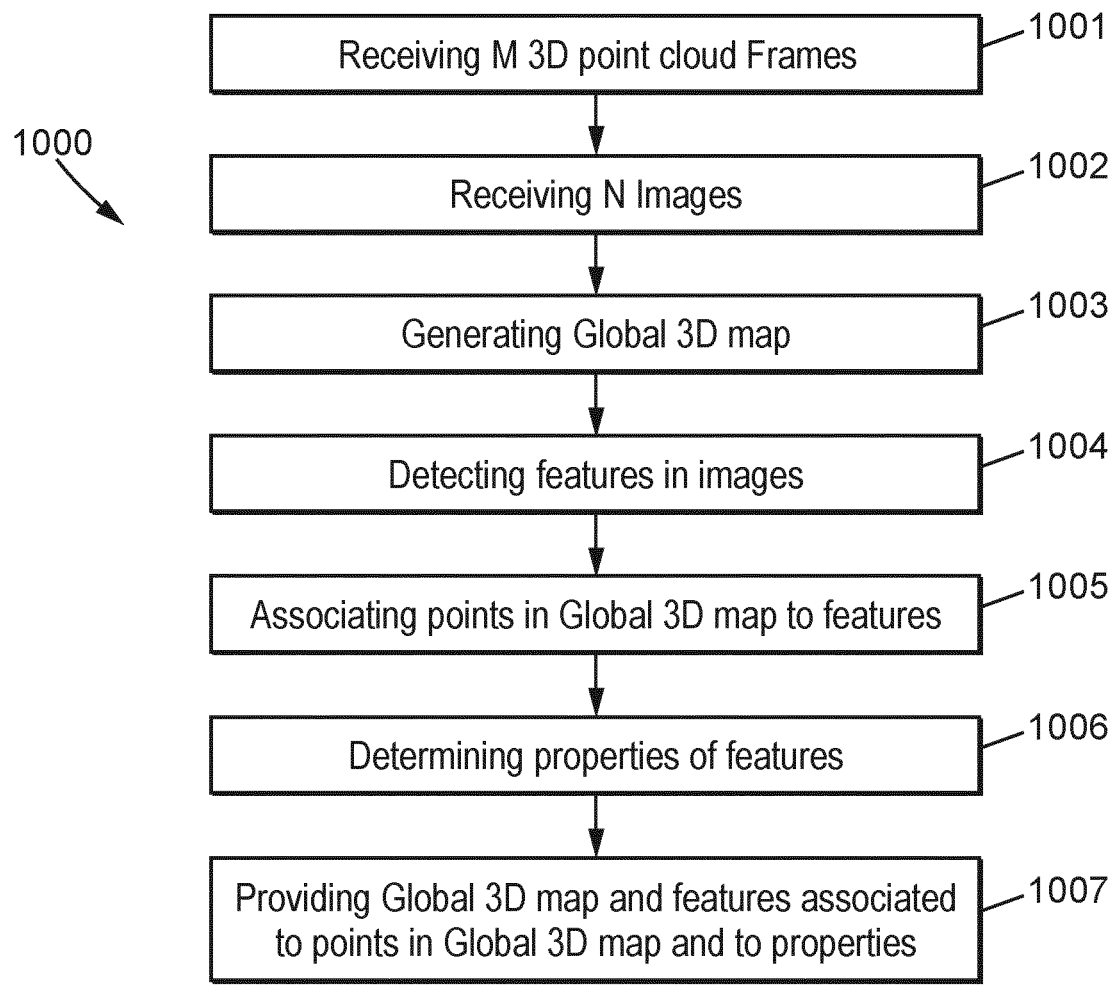
FIG. 2 is a flow chart diagram illustrating the process implemented by the processing unit in the surveillance sensor system of FIG. 1.

FIG. 2 illustrates the flow chart of method 1000 implemented by the processing unit 101 of surveillance sensor system 100. The processing unit is:
  receiving the first stream (step 1001) of a plurality of N point cloud frames (PCF) from the tridimensional sensor 102,
  receiving the second stream (step 1002) of a plurality of M images from the camera 103, and
  generating a global tridimensional map (step 1003) by merging the tridimensional data points of the plurality of N point cloud frames, in a reference coordinate system.

The merging of the tridimensional data points of the plurality of N point cloud frames is converting the tridimensional data points from each point cloud frame PCF (in local coordinate system) into tridimensional data points in a reference coordinate system. The reference coordinate system is needed as the device (and sensors) may be moving, and the tridimensional data points in local coordinate system must be converted into a not-moving coordinate system, the reference coordinate system.

The reference coordinate system may be coordinate system of any sensor (tridimensional sensor, camera) or a coordinate system of the device 110, said coordinate system being taken at a given or initial time instant $t_0$.

Optionally, the reference coordinate system may be any coordinate system of environment 10.

The step 1003 may uses geometry transformation operators to convert each point cloud frame PCF from local coordinate system to the reference coordinate system before merging into the global tridimensional map. Then, the global tridimensional map accumulates the (converted) tridimensional data points from the N point cloud frames. Therefore, the global tridimensional map comprises much more points than one point cloud frame. If the device 110 moves into the environment 10, we can guess to have up to N more points into the global tridimensional map than into one point cloud frame from the tridimensional sensor 102. Then, the global tridimensional map includes a set of tridimensional points that is not too sparse and that is dense compared to one point cloud frame.

The geometry transformation may be predetermined and stored in a memory of the processing unit. The geometry transformation may be determined by various calibration processes. The calibration process may use position and orientation sensors. The calibration process may use target markers in the environment.

For example, if the tridimensional sensor 102 provides point cloud frames PCF at a rate of 20 Hz, and the number N of point cloud frames accumulated is equal to ten (10), which corresponds to a time period DT of half a second (0.5 seconds), the number of points into the global tridimensional map may multiplied by a factor of 10 compared to the number of tridimensional data points into one point cloud frame PCF. For example, if the above tridimensional sensor 102 is measuring 1024 points at each frame, the global tridimensional map may include up to 10240 different tridimensional data points. The above values are only given as illustration for understanding.

The processing unit 101 of surveillance sensor system 100 according to present disclosure is further operating the following steps:
  detecting a plurality of features (step 1004) in the plurality of M images by processing said images,
  associating (step 1005) to each feature of the plurality of features, the tridimensional data points in the global tridimensional map belonging to said feature,
  determining properties (step 1006) of each feature of the plurality of features on the basis of the M images and the tridimensional data points associated to said feature, and
  providing to the surveillance network (step 1007), the global tridimensional map, the plurality of features including the association to the corresponding tridimensional data points in the global tridimensional map, and including the properties determined for each feature, and
  the processing unit 101 is not providing the images from the camera 103 to the surveillance network.

These images are kept locally (for example in processing unit memory), and then discarded or erased after a predetermined amount of time. Therefore, the privacy of human persons can be preserved.

The following explanations will give examples of the above steps for understanding.

At step 1004, the processing unit 101 is processing the M images from the camera 103 to detect a plurality of features in the images.

Each feature 20 may by an object, a portion of a building, a car, a plant, an animal, a human persons, etc. . . . .

This processing of detecting features may use an image recognition process of portions of image in each image or in a plurality of images, to detect any type of feature inside the second field of view 105 of the camera 103. The image recognition process may identify a feature in an image and look for it in other images. The image recognition process may identify feature in a plurality of images and recognize that this feature is one single feature.

This processing may further use an image segmentation process and/or classification process to detect any type of feature inside the second field of view 105 of the camera 103.

For example, in a street view, the processing may detect one or a plurality of cars, one or a plurality of human persons. For example, in an indoor view, the processing unit may detect one or a plurality of luggages, one or a plurality of persons.

A tag can be associated to each detected feature 20 in the images.

At step 1005, the processing unit 101 is associating tridimensional data points in the global tridimensional map to each feature of the plurality of features detected at step 1004.

For example, the processing unit can try to associate each tridimensional data point in the global tridimensional map to a detected feature.

According to an embodiment, the processing unit may project each tridimensional data point of global tridimensional map into a projected pixel in each image of the plurality of M images, to identify if said tridimensional data point can be associated to a feature detected in an image or in a group of images. For example, the association can be validated on the bases of a proximity criterion in said image or images. For example, the proximity criterion is minimizing a distance between the projected pixel of a tridimensional data point and a position of a feature detected in the image.

According to an embodiment, the above process is applied using a plurality of images in the plurality of M images. A plurality of projected pixels in each image of the plurality of M images is used in the proximity criterion. The proximity criterion is minimizing all the distances between the projected pixels and the feature detected in the plurality of images.

The tag previously associated to a specific feature can then be associated again to a plurality of tridimensional data points that correspond to said specific feature.

Then, a tag is associated to a specific feature in the images and to tridimensional data points in the global tridimensional map.

At step 1006, the processing unit 101 is determining properties of each feature of the plurality of features.

For example, from the M images used to detect a feature 20, the processing unit 101 may identify:

the feature type: the feature may be an object, a car, an animal, a human person, etc . . . , and/or the feature color: the feature may be red or green or blue, or else, and/or some feature sub-types, such as the person wears a blue trousers, and a yellow shirt.

This processing of determining properties of a feature may use an image recognition process of portions of image in each image or in a plurality of images. The image recognition process may identify a feature propertie(s) in an image and look for it(them) in other images. The image recognition process may identify feature propertie(s) in a plurality of images and recognize that these features propertie(s) belong to one feature.

Such image recognition process may use an image segmentation process and/or a classification process to detect any kind of properties concerning the features.

The process therefore includes a list of properties to be searched for, for any type of feature.

For example, from tridimensional data points associated to a feature 20, the processing unit 101 may identify any one of the following property:

the position of said feature 20 in the environment 10, and/or the direction of displacement of said feature 20 in the environment 10, and/or the speed of displacement of said feature 20 in the environment 10, and/or the size of said feature 20 in any direction.

At step 1007, the processing unit 101 is providing to the surveillance network 200, the global tridimensional map, the plurality of features including the association of each feature to the corresponding tridimensional data points in the global tridimensional map, and to properties determined for each feature.

But, at this step 1007, the processing unit is not providing the images from the camera to the surveillance network 200. These images are only used for the above steps 1004 to 1006 to detect features, to associate tridimensional data points of global tridimensional map, and to determine features properties.

In other words, the images are kept in memory of processing unit 101 for processing and for example for processing new point cloud frames PCF from tridimensional sensor 102 and/or for new detections of features. But, after a predetermined time period the oldest images are erased from memory, and never transferred/provided to the surveillance network 200.

Thanks to the above processing of point cloud frames from tridimensional sensor 102 and processing of images from camera 103, the surveillance network 200 receives a global tridimensional map with associated features and properties of these features. It can generate a modeled tridimensional view of environment including tag information that can be easily highlighted (for example by various colors or symbols). The various features can be easily tracked in the environment 10, and from this tracking the behaviors of persons in the environment can be analyzed.

But, from this modeled tridimensional view, the identity of a human person cannot be determined. Privacy regulations are then respected by the surveillance network 200 using the data from the surveillance sensor system according to present disclosure.

According to an embodiment, the processing unit 101, the tridimensional sensor 102 and the camera 103 are integrated into one single device. The processing unit 101 is therefore directly receiving the images from camera 103. The images are locally stored in memory of processing unit and not shared to the surveillance network.

According to an embodiment, the processing unit 101 is integrated into the tridimensional sensor 102 or the camera 103. In case, it is integrated into the camera, the processing unit 101 is directly receiving the images from camera 103. The images are locally stored in memory of processing unit 5 and not shared to the surveillance network.

According to an embodiment, the processing unit 101 is connected to the tridimensional sensor 102 and/or to the camera 103 by a private network link, said private network link being different than a network link of the surveillance network. The privacy of data communicated to the processing unit 101 is satisfied.

The private network link may be a wired link (by copper cables or glass fiber cables) or a wireless link such as a WiFi link, or else.

According to an embodiment, the surveillance sensor system 100 may include a plurality of tridimensional sensors 102. For example, the system includes two or more tridimensional sensors.

According to an embodiment, the surveillance sensor system 100 may include a plurality of cameras 103. For example, the system includes two or more cameras.

The plurality of tridimensional sensors and/or the plurality of cameras may be connected to the processing unit 101 by a private network link, said private network link being different than a network link of the surveillance network. The privacy of data communicated to the processing unit 101 is satisfied.

The private network link may be a wired link (by copper cables or glass fiber cables) or a wireless link such as a WiFi link, or else.

The invention claimed is:

1. A surveillance sensor system for a surveillance network, said surveillance sensor system being configured to monitor an environment surrounding a device, and comprising:
    a processing unit,
    a tridimensional sensor, and
    a camera,
    wherein the tridimensional sensor and the camera are mounted on the device and adapted to communicate with the processing unit, and
    wherein the processing unit is configured to:
    receive a first stream comprising a plurality of N point cloud frames from a tridimensional sensor having a first field of view, each point cloud frame comprising a set of tridimensional data points acquired by said tridimensional sensor, said tridimensional data points being representative of features located in the environment, the features being distinct elements in the environment,
    receive a second stream comprising a plurality of M images from the camera having a second field of view, each image being a matrix of pixels having color values corresponding to sensed light from the features located in the environment represented by the tridimensional data points,
        wherein the first field of view and the second field of view are intersecting in the environment substantially at the location of the features, and wherein the time instants of the point cloud frames and the time instants of the images are included into a common time period in which the data from first and second streams are analyzed,
    detect a plurality of the features in the plurality of M images by processing said images,
    for each given said detected feature, associate the detected feature to the tridimensional data points in a global tridimensional map belonging to said given feature, said associating comprising:
        projecting each of the tridimensional data points into a projected said pixel in each of the images, and
        determining whether the projected pixel in the image corresponds to one of the detected features, based on a proximity criterion that minimizes a distance between the projected pixel and the feature detected in the image,
    determine properties of each given said feature of the plurality of detected features on the basis of the M images and the tridimensional data points associated to said given feature, and
    provide to the surveillance network, the global tridimensional map, the plurality of detected features including the association of said detected features to the corresponding tridimensional data points in the global tridimensional map, and including the properties determined for each said detected feature,
    wherein the processing unit is further configured:
        not to provide the images from the camera to the surveillance network, and
        to discard or erase the images after a predetermined period of time.

2. The system according to claim 1, wherein detecting the plurality of features in the plurality of M images is processed by an image recognition process of portions in each said image or in a plurality of said images.

3. The system according to claim 1, wherein detecting the plurality of features in the plurality of M images is using a classification process of portions in each said image or in a plurality of said images.

4. The system according to claim 1, wherein associating of a feature is using a plurality of images in the plurality of M images, and a plurality of the projected pixels in each said image of the plurality of M images, and a proximity criterion that minimizes all the distances between the projected pixels and the feature detected in the images.

5. The system according to claim 1, wherein the properties include a color value of at least a portion of each said feature.

6. The system according to claim 1, wherein the processing unit, the tridimensional sensor and camera are integrated into one single device.

7. The system according to claim 1, wherein the processing unit is integrated into the tridimensional sensor or the camera.

8. The system according claim 1, wherein the processing unit is connected to the tridimensional sensor and/or to the camera by a private network link, said private network link being different than a network link of the surveillance network.

9. The system according to claim 1, wherein the tridimensional sensor is a light detection ranging sensor.

10. The system according to claim 2, wherein detecting the plurality of the features in the plurality of M images is using a classification process of portions in each said image or in a plurality of said images.

11. The system according to claim 2, wherein associating of one of the features to said tridimensional data points is processed by projecting each said tridimensional data point into a projected said pixel in the images, and by determining if a projected pixel in an image can correspond to a feature detected, on the bases of a proximity criterion that minimizes a distance between the projected pixel and the feature detected in the image.

12. The system according to claim 2, wherein the properties include a color value of at least a portion of each said feature.

13. The system according to claim 3, wherein the properties include a color value of at least a portion of each said feature.

14. The system according to claim 2, wherein the processing unit, the tridimensional sensor and camera are integrated into one single device.

15. The system according to claim 3, wherein the processing unit, the tridimensional sensor and camera are integrated into one single device.

16. The system according to claim 4, wherein the processing unit, the tridimensional sensor and camera are integrated into one single device.

17. The system according to claim 5, wherein the processing unit, the tridimensional sensor and camera are integrated into one single device.

* * * * *